(12) United States Patent
Zheng (10) Patent No.: US 10,386,203 B1
(45) Date of Patent: Aug. 20, 2019

(54) SYSTEMS AND METHODS FOR GYROSCOPE CALIBRATION

(71) Applicant: InvenSense, Incorporated, San Jose, CA (US)

(72) Inventor: Yuan Zheng, Fremont, CA (US)

(73) Assignee: InvenSense, Inc., San Jose, CA (US)

( * ) Notice: Subject to any disclaimer, the term of this patent is extended or adjusted under 35 U.S.C. 154(b) by 13 days.

(21) Appl. No.: 14/933,663

(22) Filed: Nov. 5, 2015

(51) Int. Cl.
*G01C 25/00* (2006.01)

(52) U.S. Cl.
CPC .................................. *G01C 25/005* (2013.01)

(58) Field of Classification Search
CPC .............................. G01C 25/00; G01C 25/005
See application file for complete search history.

(56) References Cited

U.S. PATENT DOCUMENTS

| | | | | | |
|---|---|---|---|---|---|
| 8,296,063 | B1* | 10/2012 | Baillot | .................. | G01C 21/206 701/433 |
| 2009/0265671 | A1* | 10/2009 | Sachs | ....................... | G06F 3/017 715/863 |
| 2010/0214216 | A1* | 8/2010 | Nasiri | ....................... | A63F 13/06 345/158 |
| 2011/0178707 | A1* | 7/2011 | Sachs | ....................... | G01C 17/38 701/472 |
| 2012/0007713 | A1* | 1/2012 | Nasiri | .................... | G06F 1/1694 340/5.81 |
| 2012/0125101 | A1* | 5/2012 | Seeger | ................ | G01C 19/5733 73/504.14 |
| 2013/0233048 | A1* | 9/2013 | Anac | ..................... | G01C 25/005 73/1.77 |
| 2013/0246848 | A1* | 9/2013 | Gao | ........................ | G06F 11/27 714/25 |
| 2014/0081592 | A1* | 3/2014 | Bellusci | ............. | G01R 33/0064 702/141 |
| 2014/0202229 | A1* | 7/2014 | Stanley | ................ | G01C 25/005 73/1.79 |
| 2014/0278183 | A1* | 9/2014 | Zheng | ..................... | G01P 21/00 702/96 |
| 2014/0288878 | A1* | 9/2014 | Donaldson | ........... | A61B 5/1123 702/141 |
| 2015/0251903 | A1* | 9/2015 | Bowles | .................... | H01L 25/50 257/415 |
| 2015/0354980 | A1* | 12/2015 | Wahdan | .................. | G01C 17/38 324/202 |
| 2016/0093124 | A1* | 3/2016 | Shi | ........................ | G07C 5/0808 701/2 |
| 2016/0231138 | A1* | 8/2016 | Roberts-Thomson | ...................... | G01C 19/00 |
| 2016/0290808 | A1* | 10/2016 | Barrau | ................. | G01C 25/005 |
| 2016/0363460 | A1* | 12/2016 | Sarbishei | ............. | G01C 25/005 |
| 2018/0112986 | A1* | 4/2018 | Putnam | ............. | G01C 21/3632 |
| 2018/0146319 | A1* | 5/2018 | Benattar | ................. | H04S 7/303 |

\* cited by examiner

*Primary Examiner* — Peter J Macchiarolo
*Assistant Examiner* — Alexander A Mercado
(74) *Attorney, Agent, or Firm* — Bay Area Technology Law Group PC (57) ABSTRACT

Systems and devices are disclosed for calibration of gyroscope sensitivity. By comparing a reference orientation determined without gyroscope data to estimated orientations determined with gyroscope data, a calibrated sensitivity value may be derived using a known relationship between a reference orientation and estimated orientations difference and gyroscope sensitivity.

22 Claims, 5 Drawing Sheets

SYSTEMS AND METHODS FOR GYROSCOPE CALIBRATION

FIELD OF THE PRESENT DISCLOSURE

This disclosure generally relates to the calibration of sensors and more specifically to calibrating the sensitivity of a gyroscope.

BACKGROUND

The development of microelectromechanical systems (MEMS) has enabled the incorporation of a wide variety of sensors into mobile devices, such as cell phones, laptops, tablets, gaming devices and other portable, electronic devices Non-limiting examples of such sensors include an accelerometer, a gyroscope, a magnetometer, a pressure sensor, a microphone, a proximity sensor, an ambient light sensor, an infrared sensor, and the like Further, sensor fusion processing may be performed to combine the data from a plurality of sensors to provide an improved characterization of the device's motion or orientation. However, due to the nature of electronics and mechanics, MEMS-based sensors may be prone to having bias (offset) and sensitivity errors. These errors may drift and or change due to temperature, humidity, time, external shocks, assembly stress and other changes in peripheral conditions. In turn, inaccurate bias and/or sensitivity may result in decreased quality of sensor data and may complicate the sensor fusion process used to estimate parameters such as attitude (e.g., pitch, toll, and yaw), heading reference and the like which are dependent on the precision of the sensors' outputs. For example, when integration of raw data output by the sensor is used to determine position or velocity from acceleration, or orientation angle from the angular velocity, the bias or sensitivity inaccuracies may be significantly magnified In light of these characteristics of MEMS sensors, it may be desirable to perform a sensor calibration operation to characterize any possible bias or sensitivity error, enabling a correction of the sensor data. Sensors implemented with other technologies also benefit from calibration. A sensor calibration operation may employ mathematical calculations to deduce various motion states and the position or orientation of a physical system A sensor bias or sensitivity factor may be produced by the calibration operation, which may then be applied to the raw sensor data, effectively calibrating the sensor. As will be appreciated, the calibration operation may be performed during manufacture as well as being performed (periodically) while the device is being used to account for changes that may occur over time.

Accordingly, performing a calibration operation may be used to improve the quality of data obtained from the sensor It would be desirable to perform the operation in a manner that reduces the involvement required of the user. Further, it would also be desirable to reduce energy and computational power consumed while calibrating. In another aspect, it would be desirable to perform the calibration automatically or semi-automatically, such as in the background to improve the quality of sensor information provided without interrupting the user. Correspondingly, it would be desirable to calibrate one sensor using information from another sensor present on the device. To address these needs, this disclosure is directed to a device and method for calibrating a gyroscope of a portable device using other sensor information as will be described in the materials below.

SUMMARY

As will be described in detail below, this disclosure includes a method for calibrating gyroscope sensitivity for a portable device that may include determining a reference orientation for the portable device during a first period, obtaining gyroscope data for the portable device during a second period, determining estimated orientations for the portable device from the gyroscope data using a plurality of candidate sensitivity values, determining a difference between the reference orientation and the estimated orientations and deriving a calibrated sensitivity value using a known relationship between the reference orientation and estimated orientations difference and gyroscope sensitivity.

This disclosure also includes a portable device having a gyroscope for providing gyroscope data and a calibration module for calibrating gyroscope sensitivity The calibration module may determine a reference orientation for the portable device during a first period, determine estimated orientations for the portable device from the gyroscope data during a second period using a plurality of candidate sensitivity values, determine a difference between the reference orientation and the estimated orientations and derive a calibrated sensitivity value using a known relationship between the reference orientation and estimated orientations difference and gyroscope sensitivity.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details In some instances, well known structures and devices are shown in block diagram form in order to avoid obscuring the novelty of the exemplary embodiments presented herein For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art In the present application, a procedure, logic block, process, or the like, is conceived to be a self-consistent sequence of steps or instructions leading to a desired result. The steps are those requiring physical manipulations of physical quantities Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above The non-transitory processor-readable data storage medium may form part of a computer program product, which may include packaging materials The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein In addition, in some aspects, the functionality described herein may be provided within dedicated software modules or hardware modules configured as described herein Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains Finally, as used in this specification and the appended claims, the singular forms "a," "an" and "the" include plural referents unless the content clearly dictates otherwise The orientation of a device is generally expressed with relation to a reference frame An orientation may also indicate how one reference frame is rotated with respect to another reference flame. A flame of reference for a portable device may be referred to as the body flame, having three orthogonal axes. This body flame is 'fixed' to the device and rotates with the device. Similarly, a world reference frame may have axes fixed to the Earth, such as by aligning the Z axis of the world flame with the gravity vector resulting from Earth's gravity field, pointing from the surface of the Earth to the sky. An additional axis may be aligned with the Earth's magnetic field, e.g. pointing North. The orientation of the portable device may be expressed as how the body reference frame of the device is rotated with respect to the world reference flame, Although the math and descriptions provided in this disclosure are in the context of these frames, one of skill in the art will realize that similar operations may be performed using other definitions and frames of reference All the teachings could be redone with different definitions. Thus, the orientation of a portable device may be expressed as the rotational operation that translates the body frame to the world frame, such as a rotation operation that aligns the Z axis of the body frame with the gravity vector. In some embodiments, the rotation operation may be expressed in the form of a unit quaternion. Although not discussed, alternative methods of expressing the orientation, such as e.g Euler angles, rotation matrices etc, may be used following identical strategies. As used herein, the terms "quaternion" and "unit quaternion" may used interchangeably for convenience. Accordingly, a quaternion may be a four element vector describing the transition from one rotational orientation to another rotational orientation and may be used to represent the orientation of a portable device. A unit quaternion has a scalar term and 3 imaginary terms. In this disclosure, the quaternion is expressed with the scalar term first followed by the imaginary terms but, appropriate modifications may be made to the formulas, equations and operations to accommodate different definitions of quaternion As noted above, certain techniques of this disclosure are directed to calibrating a gyroscope in a portable device One use of information from a gyroscope integrated into a portable device is to calculate the rotation orientation of the device in the form of a quaternion according to Equation (1), where $Q_k$ is the quaternion expressing the orientation of the device as a rotation and $\omega_1$ is the true 3-D angular velocity:

$$Q_{k+1} = Q_k + \frac{1}{2} Q_k \otimes \begin{bmatrix} 0 \\ \omega_T \cdot \Delta_t \end{bmatrix} \quad (1)$$

The equation shows how the orientation $Q_{k+1}$ can be derived from the orientation $Q_k$ and the angular velocity $\omega_1$ measured by the gyroscope. The angular velocity $\omega_1$ can be determined by multiplying the gyroscope signals $\overline{\omega}_x$, $\overline{\omega}_y$, and $\overline{\omega}_z$ with their respective sensitivity factors $k_x$, $k_y$, and $k_z$, and correcting for the bias b, as indicated by Equation (2):

$$\omega_T = \begin{bmatrix} (\overline{\omega}_x k_x - b_x) \\ (\overline{\omega}_y k_y - b_y) \\ (\overline{\omega}_z k_z - b_z) \end{bmatrix} \quad (2)$$

In this embodiment, cross-talk between axes and skew in gyroscope measurement are not modeled in the interests of clarity However, by employing a 3×3 matrix format, these techniques may be extended to a generic gyroscope model that includes the skew and cross-talk anomaly.

As indicated, a gyroscope may experience errors both in terms of sensitivity and bias. The gyroscope sensitivity is typically more stable than the gyroscope bias and may be on the order of less than 2.5% in some embodiments. Timing clock inaccuracies may also result in errors when the gyroscope data is integrated. Gyroscope bias may be determined by analyzing the quaternion drift during the slow motion For example, the quaternion drift on x and y axes in an inertial frame (or world coordinate frame) may be obtained from accelerometer information Consequently, the gyroscope drift in the 2-D inertial frame may be translated into the 3-D body frame for a time period, allowing estimation of the gyroscope bias Accordingly, embodiments of this disclosure may be directed to calibration of gyroscope sensitivity, such as when gyroscope bias is corrected or small relative to the sensitivity errors. In one aspect, the gyro bias may be small enough to keep the quaternion drift during sensitivity calibration within 0 1 degree for a period of time, such as approximately 4 seconds or less.

An error in the sensitivity of the gyroscope may lead to an error in the determined angular velocity, which in turn may lead to an error in the calculated orientation. For example, the signal $\overline{\omega}$ output by a gyroscope when the portable device is undergoing sufficient motion may be related to angular velocity $\omega$ by the sensitivity k according to Equation (3):

$$\omega = \overline{\omega} \cdot k \quad (3)$$

In this example, it is assumed that the bias is corrected for. This relationship may be extended to incorporate the sensitivity error $\varepsilon_k$, which may lead to the angular velocity error $\varepsilon_\omega$ as indicated in Equation (4):

$$\omega + \varepsilon_\omega = \overline{\omega} \cdot (k + \varepsilon_k) \quad (4)$$

This equation shows that the angular velocity error is proportional to the sensitivity error. Further, Equation (5) shows that integrating the angular velocity $\omega$ over time t gives the orientation angle $\varphi$ of the portable device:

$$\varphi = \omega \cdot \Delta t \quad (5)$$

Correspondingly, the error in orientation angle $\varepsilon_\varphi$ is also proportional to the sensitivity error $\varepsilon_k$ An error in orientation angle due to an error in the sensitivity may be determined by comparing the orientation derived from the gyroscope signal to a reference orientation. In the absence of a sensitivity error, the orientation based on the gyroscope equals the reference orientation, which may have been determined using other sensors, such as e g the accelerometer. If the sensitivity of the gyroscope is not known, the orientation of the portable device may be determined using a plurality of candidate sensitivities, for example using a Monte Carlo based approach. Since the orientation angle error is related to the sensitivity error of the candidate sensitivities, comparing the estimated orientations based on the candidate sensitivities to the reference orientation may derive a calibrated sensitivity value by determining a sensitivity value that represents a reduced orientation angle error As noted above, the orientation of the portable device may be expressed as a quaternion For example, the quaternion $Q_R$ may be the reference orientation of the portable device and the quaternion $Q_E$ may be an estimated orientation obtained by using one of the candidate sensitivities The angle $\theta$ between the two quaternions is determined by their dot product as indicated by Equation (6):

$$\cos\left(\frac{\theta}{2}\right) = Q_R \cdot Q_E \quad (6)$$

Figure 1:
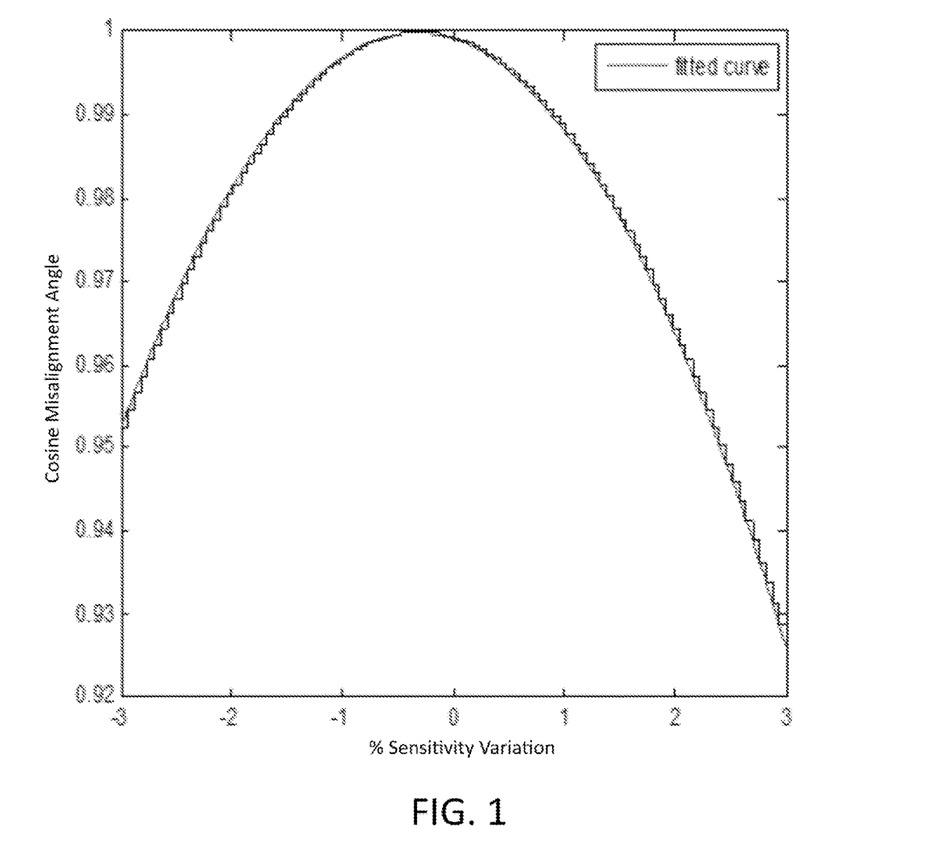
FIG. 1 is a schematic diagram graphing a relationship between a difference between a reference orientation and estimated orientation and gyroscope sensitivity according to an embodiment.

The angle $\theta$ between quaternions $Q_R$ and $Q_E$ is comparable to the orientation angle error $\varepsilon_\varphi$ that, as shown by Equations (4) and (5) is proportional to the gyroscope sensitivity error $\varepsilon_k$. By extension, the dot products of the quaternions $Q_R$ and $Q_E$ is likewise related to $\cos(k)$. A graph of the relationship between the cosine of the misalignment angle $$\cos\left(\frac{\theta}{2}\right)$$

and different sensitivity candidates k is shown in FIG. 1. The x-axis of the figure corresponds to the variation of the sensitivity with respect to e g. the sensitivity specification. For example, a value of ±2% means that the sensitivity candidate is 2% larger than then sensitivity specification, and a value of −2% means that the sensitivity candidate is 2% smaller than then sensitivity specification As can be seen, the relationship has a maxima when $$\cos\left(\frac{\theta}{2}\right)$$

equals 1 This represents the reference orientation being the same as the estimated orientation obtained when using that sensitivity value, resulting in no angle difference between the corresponding quaternions As will be appreciated, the error angle $\theta$ may be calculated by taking the inverse cosine of the dot product to provide a linear relation with the sensitivity factor k A sufficient number of candidates of sensitivities k may be used to obtain the desired resolution in the determined sensitivity k. However, calculating the inverse cosine adds complicated computations, and since when working with quaternions the dot product results in a cosine relation, it may be computationally efficient to take advantage of such a relation Because of the symmetry of the cosine relaxation, the cosine may be approximated by a quadratic model. Modeling the relationship shown in FIG. 1 as a second order quadratic equation allows an increase in computational efficiency by avoiding the need to calculate the inverse cosines as indicated by Equation (7):

$$f(x) = p_1 x^2 + p_2 x + p_3 \quad (7)$$

As an additional benefit, the number of candidates employed may be reduced while retaining a relatively high accuracy in determining the sensitivity In one simulation, the quadratic model of Equation (7) was solved using 101 samples to obtain the coefficients of $p_1 = -0.006667$, $p_2 = -0.004395$ and $p_3 = 0.9992$, with 95% confidence bounds for $p_1$ of (−0.006672, −0.006662), for $p_2$ of (−0.004403, −0.004388) and for $p_3$ of (0.9992, 0.9992). Finding the maximum of the curve, which corresponds to a minimum error, by finding the sensitivity value where the derivative equals zero at $-p_2/p_1/2$ returns a sensitivity value of −0.3292%. For comparison, in another simulation Equation (7) was then solved using only three sensitivity candidates to obtain a similar curve with the coefficients of $p_1 = -0.006636$, $p_2 = -0.004383$ and $p_3 = 0.999$, with a corresponding optimum sensitivity value of −0.3300% This example shows that by taking advantage of the cosine relation, which can be approximated by a second order quadratic relation, the candidate sensitivity leading to the smallest error in the orientation calculation can be determined with computational efficiency. Therefore, in some embodiments, a calibrated sensitivity may be determined using only a small number (e g. three) of sensitivity candidates. For example, the current sensitivity, or the sensitivity according to the specification, and plus and minus e.g. 5% or 10% may be used If desired, the process of candidate selection may be performed iteratively, by selecting a first series of candidates relative to the current sensitivity and selecting subsequent series of refined candidates relative to the sensitivity determined in the previous iteration but with a smaller range of candidates. The calibrated sensitivity value may be determined using a minimal number of candidates for efficiency as noted. Depending on the characteristics of the predefined relationship, the minimal number of candidates may vary. For example, for the cosine relationship described above, three candidates may be sufficient to determine the curve. Further, if the value for the cosine relationship is known or assumed, (such as one for the embodiment described above), two candidates may be sufficient. Alternatively, if the relationship is linear, such as the inverse cosine relationship described above, two candidates may also be sufficient in those embodiments Moreover, the minimal number of candidates may also be based on a desired accuracy of the calibration.

As discussed above, estimated orientations for the portable device may be determined from undergoing sufficient motion by employing candidate values for the sensitivity—applied to the gyroscope signals These estimated orientations are then compared to a reference orientation. With the correct sensitivity, the angle difference between the estimated orientation and the reference orientation should approach zero. Accordingly, any suitable technique may be used to determine the reference orientation When used for calibrating the gyroscope, the reference orientation may be determined without using the gyroscope. For example, the reference orientation may be determined using accelerometer data alone without gyroscope data, although any suitable technique may be employed. The rotation operation representing the orientation of the portable device may be described as a rotation of angle $\theta$ about the unit vector $[u_x, u_y, u_z]$ as indicated by Equation 8:

$$\overline{Q} = \begin{bmatrix} \cos\left(\frac{\theta}{2}\right) \\ \sin\left(\frac{\theta}{2}\right) \cdot u_x \\ \sin\left(\frac{\theta}{2}\right) \cdot u_y \\ \sin\left(\frac{\theta}{2}\right) \cdot u_z \end{bmatrix} \quad (8)$$

Raw data output by an accelerometer in the portable device may be in the form of an acceleration component for each orthogonal axis of the body frame of the device, such as $A_x$, $A_y$ and $A_z$. Conversion of this data to acceleration in the world frame, $A_{wx}$, $A_{wy}$ and $A_{wz}$ may be performed readily using quaternion multiplication and inversion. For quaternions $$\overline{Q_1} = \begin{bmatrix} q_{1w} \\ q_{1x} \\ q_{1y} \\ q_{1z} \end{bmatrix} \text{ and } \overline{Q_2} = \begin{bmatrix} q_{2w} \\ q_{2x} \\ q_{2y} \\ q_{2z} \end{bmatrix},$$

quaternion multiplication may be designated using the symbol "⊗" and defined as shown in Equation 9 while quaternion inversion may be designated using the symbol "'" and defined as shown in Equation 10:

$$\overline{Q_1} \otimes \overline{Q_2} = \begin{bmatrix} q_{1w} \cdot q_{2w} - q_{1x} \cdot q_{2x} - q_{1y} \cdot q_{2y} - q_{1z} \cdot q_{2z} \\ q_{1w} \cdot q_{2x} + q_{1x} \cdot q_{2w} + q_{1y} \cdot q_{2z} - q_{1z} \cdot q_{2y} \\ q_{1w} \cdot q_{2y} - q_{1x} \cdot q_{2z} + q_{1y} \cdot q_{2w} + q_{1z} \cdot q_{2x} \\ q_{1w} \cdot q_{2z} + q_{1x} \cdot q_{2y} - q_{1y} \cdot q_{2x} + q_{1z} \cdot q_{2w} \end{bmatrix} \quad (9)$$

$$\overline{Q_1'} = \begin{bmatrix} q_{1w} \\ -q_{1x} \\ -q_{1y} \\ -q_{1z} \end{bmatrix} \quad (10)$$

The acceleration in the world flame may be determined by converting the acceleration measured in the body frame using a known orientation. Equation 11 shows the quaternion multiplication of the orientation $Q_N$ with the acceleration in the body frame to calculate the acceleration Aw in the world flame:

$$A_w = \begin{bmatrix} 0 \\ A_{wx} \\ A_{wy} \\ A_{wz} \end{bmatrix} = \overline{Q_N} \otimes \begin{bmatrix} 0 \\ A_x \\ A_y \\ A_z \end{bmatrix} \otimes \overline{Q_N'} \quad (11)$$

When the portable device is moving sufficiently slowly, the orientation may be considered relatively constant and there may be substantially no linear acceleration. Quaternion techniques may be applied to derive the amount of linear acceleration, which may be determined to establish the amount of motion (i.e. linear acceleration) of the device, as is explained further in co-pending U.S. patent application Ser. No. 14/680,993, filed Apr. 7, 2015, which is hereby incorporated by reference in its entirety and may be consulted for further details. Thus, given accurate acceleration measurements, the accelerometer only measures the acceleration in the body frame due to gravity and $A_{wx}$ and $A_{wy}$ may be zero with $A_{wz}$ equaling the gravitational acceleration, i.e. the acceleration vector in the world frame corresponds to the gravitational vector, allowing determination of a reference orientation established with respect to gravity Based on the accelerometer measurements, there may be no information relating to the orientation of the portable device in the plane perpendicular to gravity, i.e. with respect to the North. In some embodiments, the estimated orientations derived by applying the candidate sensitivities to the gyroscope measurements may be determined with respect to gravity, and therefore the calculations are performed with two degrees of freedom. In other embodiments, magnetometer data may be available for the portable device to provide heading information and the reference orientation and estimated orientations may be compared with three degrees of freedom.

Certain motion conditions experienced by the portable device may facilitate calibration of gyroscope sensitivity according to the techniques of this disclosure. For example, it will be appreciated that determination of a reference orientation using accelerometer data may be performed when the portable device is undergoing a period of reduced or no motion. Further, the estimated orientations are derived from gyroscope measurements during periods when the portable device is undergoing a period of increased motion. As such, it may be desirable to perform a calibration routine for gyroscope sensitivity using the techniques of this disclosure when a suitable motion pattern exists to enable determination of the reference and estimated orientations. As an illustrative example, FIG. 2 graphically illustrates accelerometer data represented as trace 10 and integrated gyroscope data, or traveled angle, represented as trace 12. (In this example the device is a smartphone, with the z-axis perpendicular to the display of the device, and the y-axis and x-axis aligned with the long and short sides of the device respectively.) During periods of reduced (or no) motion, such as periods 14 and/or 18, the accelerometer measurements may be used to derive a reference orientation as described above. Likewise, during periods of increased motion, such as period 16, estimated orientations may be derived from the gyroscope measurements.

Figure 2:
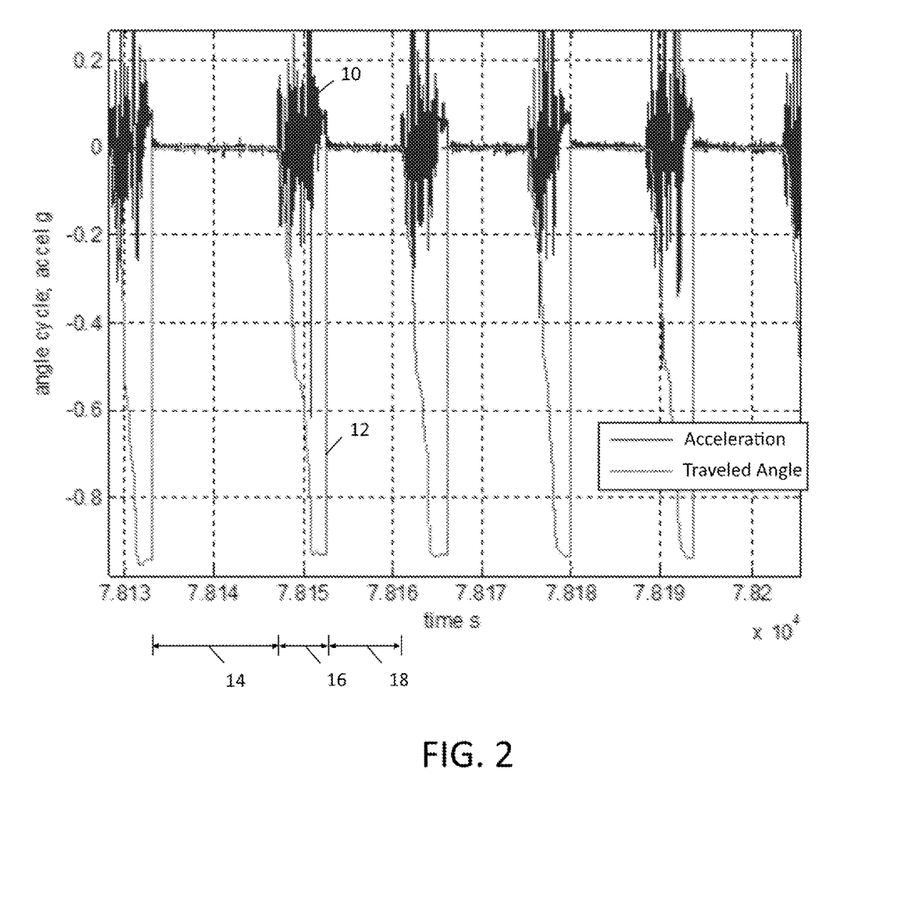
FIG. 2 is a schematic diagram of inertial sensor data used to determine a reference orientation and estimated orientations according to an embodiment.

Outputs from the gyroscope and/or the accelerometer may be monitored for motion patterns that allow calibration of the gyroscope sensitivity using the techniques of this disclosure. In one embodiment, a suitable pattern may be a period of increased motion, such as period 16, that is either preceded or succeeded by a period of reduced motion, such as period 14 or period 18, respectively. In another embodiment, a suitable pattern may be a period of reduced motion, such as period 14, followed by a period of increased motion, such as period 16, that is then followed by a period of reduced motion, such as period 18 The gyroscope and/or the accelerometer outputs may be monitored for existence of a suitable motion pattern and the calibration routine may be performed when the pattern is detected. This allows the calibration to be performed in the background without requiring involvement of the user Further, by recalibrating at a determined frequency when the requisite pattern is detected keeps the accuracy of the gyroscope measurements at a desired level. In another embodiment, the user may be prompted to perform a certain motion for the purpose of calibration. This request from the system towards the user may be done periodically, or after specific events, such as e g the detection of large shocks which may require recalibration of the sensor.

Further, in some embodiments it may be desirable to reduce the dimension of the problem, which may reduce the amount of candidate sensitivities and facilitates the corresponding computations. For example, a single axis of the gyroscope may be calibrated at a given time. As such, the motion pattern may be detected with respect to a single axis. In the example shown in FIG. 2, trace 10 represents acceleration on the x-axis of the body flame while trace 12 represents the integrated orientation angle with respect to the y-axis.

Figure 3:
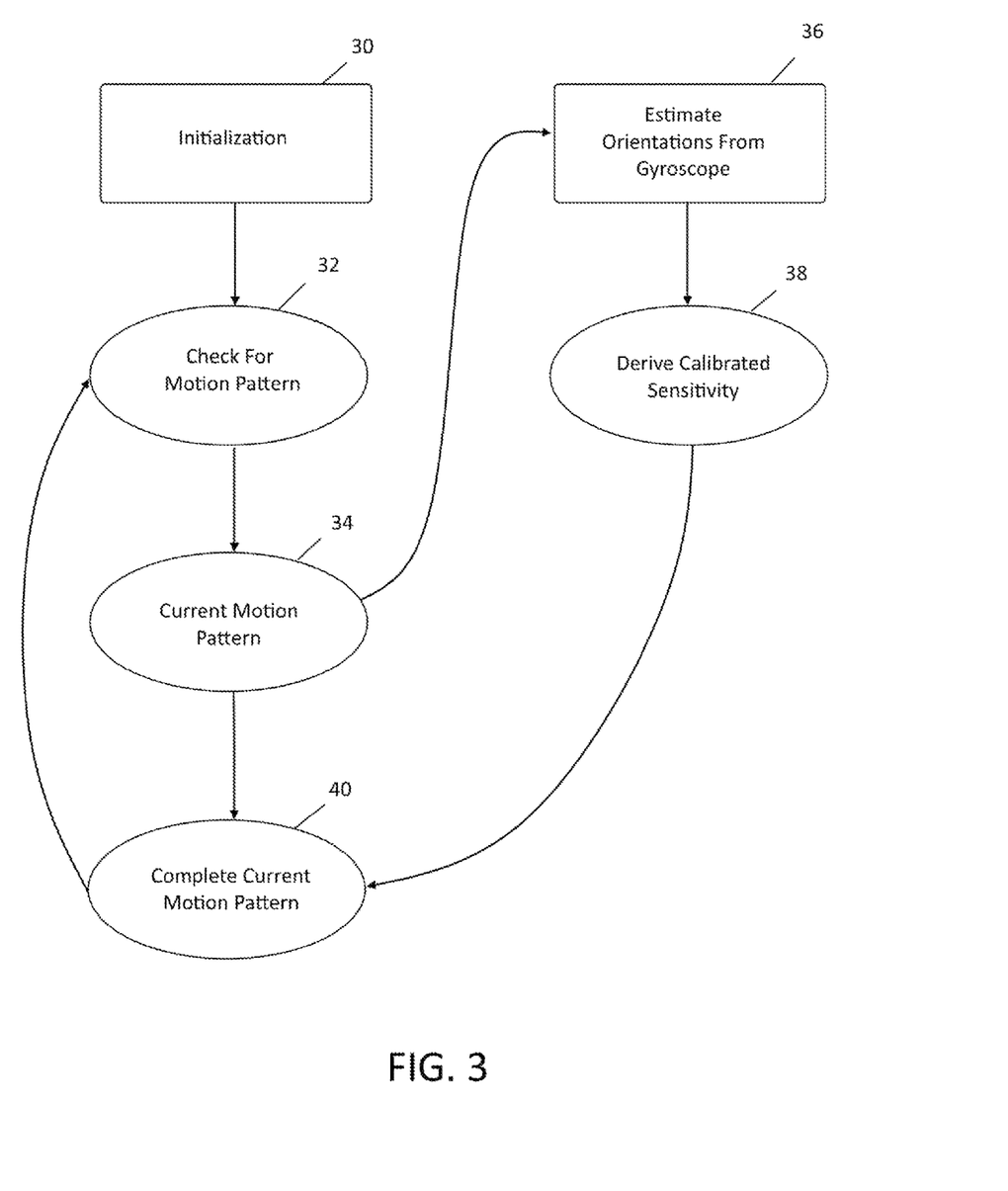
FIG. 3 is a schematic diagram of a technique for classifying motion to determine a reference orientation and estimated orientations according to an embodiment.

To help illustrate aspects related to detection of suitable motion patterns, a representative motion classifier state machine is schematically depicted in FIG. 3 that may be used with the techniques of this disclosure. In this example, the motion pattern includes a rotation along a single axis, but the methods discussed below may be applied to more complicated motion patterns e.g involving more axes Following initialization in state 30, which may include the determination of a reference orientation, the machine transitions to state 32 to check for motion characteristics on one axis to determine if sufficient motion has occurred with respect to the other axes, corresponding to a period of increased motion. For example, integration of gyroscope measurements may be used to determine if the portable device has moved more than a first threshold angle (e.g, 30°) in one axis and less than a second threshold angle (e g. 10°) on the other axes during a defined time interval. These values are representative only and may be adjusted as desired. State 32 exists until a motion along a single axis is detected that has sufficient movement, which triggers the transition to state 34 for calibration of the gyroscope of the current axis. This is indicated by the transition to state 36, where the gyroscope measurements are integrated to derive the estimated orientation using different candidate sensitivities as described above. In other words, in state 32 the system checks if the user is starting to rotate the device along a single axis If such a rotation is detected, the system moves to state 34, and while the user continues the initiated rotation, the system will apply a plurality of sensitivity candidates for the remainder of the rotation in order to deduce the different estimated orientations in state 36 The machine remains in state 36, estimating orientations until a period of reduced motion is detected to trigger transition to state 38 for determination of the calibrated sensitivity value. In one aspect, the transition to state 38 may also depend on a determination that sufficient motion has occurred along the axis being calibrated, such as if a third threshold regarding motion on the axis being calibrated is exceeded, which may be established with respect to the noise level in the system. This means that for the motion during which the estimated orientations are determined, the amplitude of the motion should be large enough to result in significant differences between the different estimated orientations and the reference orientation. While in state 38, the estimated orientations for the candidate sensitivities may be compared to a reference orientation, for example a reference orientation determined during the period of reduced motion. Following determination of the calibrated sensitivity value, the system may transition to state 40. Transition to state 40 indicates that the current axis over which the user has rotated the device has been calibrated, returning to state 32 to allow for detection of sufficient movement on another axis, or for the same axis if recalibration is desired. A timeout may be set on each axis to avoid calibrating the same axis repeatedly, which may be a unefficient use of computing power.

An example of a single axis movement made by a user may be the gesture a user makes to bring a phone to an ear to answer or make a call, in which case the rotation may mostly be along the z-axis of the device. Other typical movements during usage of the device also exist that enable the calibration of the various axis. This example also shows that certain events or triggers may also be used to initiate the calibration procedure, or at least trigger the monitoring of possible calibration occasions. For example, when the user receives an incoming call, alert, or notification, he or she is likely to pick up the phone and perform a single axis motion that enables calibration. Thus, the incoming call is a trigger to start the monitoring process More generally, any suitable operating state or usage of the portable device may be associated with a likelihood of a given motion pattern that may facilitate calibration and therefore be used as a trigger for performing one or more aspects of this disclosure.

As discussed, the period of increased motion may be followed immediately by a period of reduced motion In this case, a reference orientation may be determined immediately after the estimated orientations have been calculated using the candidate sensitivities. The candidate with the most accurate sensitivity will results in an estimated orientation close to the reference orientation. However, in some situations, the desired motion pattern may not be followed immediately by a period of reduced motion in which a reference orientation may be determined In the time period between the end of the motion pattern and the period of reduced motion, the user may move the device and change the orientation. This means that the reference orientation may be different from the estimated orientations Although this is not an ideal situation, a candidate sensitivity may still be selected because the candidate that results in the smallest difference between the estimated orientation and the delayed reference orientation may still be the best candidate A threshold may be set on the time period between the end of the motion pattern and the determination of the reference orientation, and when this time threshold is exceeded the result becomes to unreliable to perform the comparison. In practice this means that the estimated orientations for the sensitivity candidates are stored until a reference orientation can be determined. If the threshold of the time period is exceeded, these estimated orientations need no longer to be stored because any comparison made after the threshold time would be unreliable.

The graph shown in FIG. 2 helps illustrate the function of the motion classifier state machine of FIG. 3. The portable device was rotated 360° around the y-axis on a surface several times, while resting motionless on the surface between rotations, generating the accelerometer measurements on the x-axis shown as trace 10. One period of rotation is indicated by period 16, while motionless periods 14 and 18 on either side. During the period 16 during rotation, state 34 is satisfied, transitioning to state 36 as described above Trace 12 shows the estimated traveled angle, i e. to total angle of the motion, generated by integrating the gyroscope measurements for the y-axis Following detection of a reduced motion period, such as period 18 following increased motion period 16, a reference orientation may be determined for comparison in state 38 to the estimated orientations determined in state 36, allowing the calibrated sensitivity value to be calculated as described above After the calibrated sensitivity value has been determined, the system returns to state 32 waiting for the next motion pattern. The estimated orientation may be reset once a period of increased motion has ended. As shown, the single axis measurement technique does not reduce the measurement accuracy and facilitates identification of a suitable motion pattern. In other embodiments, more complicated motion patterns may be detected if desired.

Detection of a period of reduced motion to transition from state 36 to state 38 may be performed in any suitable manner. For example, total acceleration may be measured and compared to gravity. When the total acceleration is sufficiently close to 1 G, it may be determined there is no linear acceleration allowing the reference orientation to be determined using the accelerometer measurements Conversely, if the total acceleration differs from gravity by more than a defined amount, for example and without limitation, by 0.05

G-0.1 G, it may be determined that the portable device is undergoing some sort of acceleration due to motion of the device, and the determination of a reference orientation may be postponed until the proper conditions exist. As will be appreciated, the amount of deviation from 1 G allowed may depend on the desired accuracy of the reference orientation. Alternatively or in addition, a period of reduced motion may be determined using the gyroscope measurements. For example, the norm of the gyroscope measurements may be compared to a threshold, and if below the reference orientation may be calculated based on the accelerometer measurement Details regarding one embodiment of portable device 100 including features of this disclosure are depicted as high level schematic blocks in FIG. 4 As will be appreciated, device 100 may be implemented as a device or apparatus, such as a handheld device that can be moved in space by a user and its motion and/or orientation in space therefore sensed For example, such a handheld device may be a mobile phone (e.g, cellular phone, a phone running on a local network, or any other telephone handset), wired telephone (e.g, a phone attached by a wire), personal digital assistant (PDA), video game player, video game controller, navigation device, activity or fitness tracker device (e g, bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices.

Figure 4:
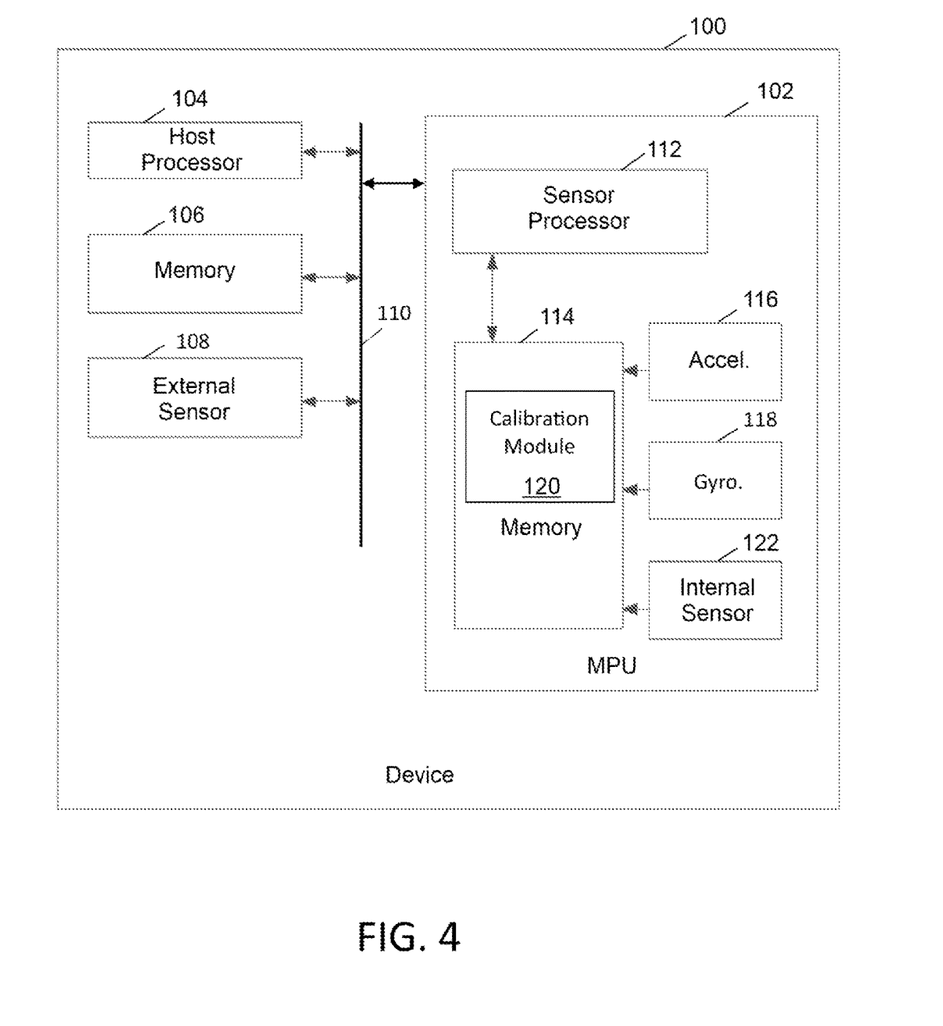
FIG. 4 is a schematic diagram of portable device for calibrating a gyroscope according to an embodiment.

In some embodiments, device 100 may be a self-contained device or may function in conjunction with another portable device or a non-portable device such as a desktop computer, electronic tabletop device, server computer, etc. which can communicate with the device 100, e g., via network connections. The device may be capable of communicating via a wired connection using any type of wire-based communication protocol (e.g, serial transmissions, parallel transmissions, packet-based data communications), wireless connection (e g, electromagnetic radiation, infrared radiation or other wireless technology), or a combination of one or more wired connections and one or more wireless connections.

As shown, device 100 includes Motion Processing Unit (MPU) 102, host processor 104, host memory 106, and may include one or more sensors, such as external sensor 108 The term external refers to the sensors 108 being external to MPU 102, and the external sensor may be included in device 100 or another device. Host processor 104 may be configured to perform the various computations and operations involved with the general function of device 100 Host processor 104 may be coupled to MPU 102 through bus 110, which may be any suitable bus or interface, such as a peripheral component interconnect express (PCIe) bus, a universal serial bus (USB), a universal asynchronous receiver/transmitter (UARI) serial bus, a suitable advanced microcontroller bus architecture (AMBA) interface, an Inter-Integrated Circuit (I2C) bus, a serial digital input output (SDIO) bus, or other equivalent. Host memory 106 may include programs, drivers or other data that utilize information provided by MPU 102. Exemplary details regarding suitable configurations of host processor 104 and MPU 102 may be found in co-pending, commonly owned U.S. patent application Ser. No. 12/106,921, filed Apr. 21, 2008, which is hereby incorporated by reference in its entirety In this embodiment, MPU 102 is shown to include sensor processor 112, memory 114, accelerometer 116 and gyroscope 118. The accelerometer and/or gyroscope may be implemented as a MEMS-based inertial sensor configured to provide raw data output corresponding to acceleration measured along three orthogonal axes or angular rates of change along three orthogonal axes, respectively, or any equivalent structures. Memory 114 may store algorithms, routines or other instructions for processing sensor data, such as calibration module 120 to perform any of the operations described above with respect to detecting motion patterns, determining and comparing reference and estimated orientations and calculating calibrated sensitivity values One or more additional internal sensors, such as internal sensor 122 may be integrated into MPU 102 as desired If provided, external sensor 108 and/or internal sensor 122 may include one or more sensors, such as accelerometers, gyroscopes, magnetometers, pressure sensors, microphones, proximity, and ambient light sensors, and temperature sensors among others sensors As used herein, an internal sensor refers to a sensor implemented using the MEMS techniques for integration with MPU 102. The components of MPU 102, such as e.g the sensor processor 112 and the various sensors, may be integrated into a single chip or package Similarly, an external sensor as used herein refers to a sensor carried on-board device 100 that is not integrated into MPU 102. An accelerometer, gyroscope and/or any other sensor used in the techniques of this disclosure may be implemented as an internal or external sensor as desired As will be appreciated, host processor 104 and/or sensor processor 112 may be one or more microprocessors, central processing units (CPUs), or other processors which run software programs for device 100 or for other applications related to the functionality of device 100. For example, different software application programs such as menu navigation software, games, camera function control, navigation software, and phone or a wide variety of other software and functional interfaces can be provided In some embodiments, multiple different applications can be provided on a single device 100, and in some of those embodiments, multiple applications can run simultaneously on the device 100. Multiple layers of software can be provided on a computer readable medium such as electronic memory or other storage medium such as hard disk, optical disk, flash drive, etc., for use with host processor 104 and sensor processor 112 For example, an operating system layer can be provided for device 100 to control and manage system resources in real time, enable functions of application software and other layers, and interface application programs with other software and functions of device 100. In some embodiments, one or more motion algorithm layers may provide motion algorithms for lower-level processing of raw sensor data provided from internal or external sensors. Further, a sensor device driver layer may provide a software interface to the hardware sensors of device 100. Some or all of these layers can be provided in host memory 106 for access by host processor 104, in memory 114 for access by sensor processor 112, or in any other suitable architecture.

In one aspect, implementing calibration module 120 in MPU 102 may allow the operations described in this disclosure to be per formed with reduced or no involvement of host processor 104. As will be appreciated, this may provide increased power efficiency and/or may free host processor 104 to perform any other task(s). However, the functionality described as being performed by calibration module 120 may be implemented using host processor 104 and memory 106 or any other combination of hardware, firmware and software or other processing resources available in portable device 100.

Figure 5:
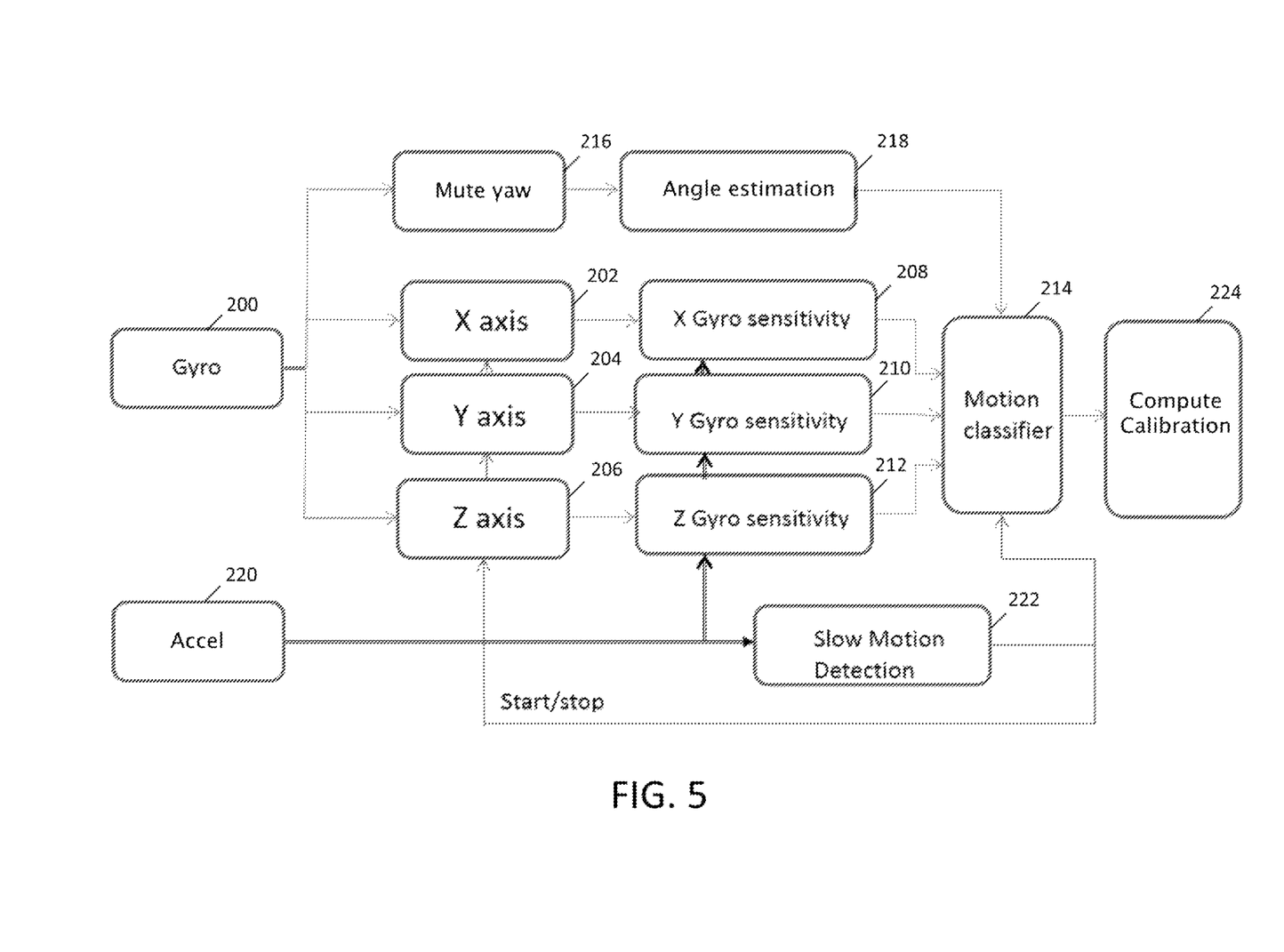
FIG. 5 is schematic diagram of an architecture for calibrating a gyroscope according to an embodiment.

As a further illustration of aspects of this disclosure, FIG. 5 shows an exemplary architecture for implementing calibration module 120. Gyroscope output 200 with three degrees of freedom, such as from gyroscope 118 of portable device 100, is provided for each orthogonal body frame axis 202, 204 and 206 The gyroscope signals are adjusted by the sensitivity values in blocks 208, 210 and 212 before being fed to motion classification block 214 Gyroscope output 200 is also reduced to two degrees of freedom in block 216, such as by muting yaw as indicated and used to estimate orientation for portable device 100 with respect to gravity in 218. Accelerometer output 220, such as from accelerometer 116 of portable device 100, may be analyzed to identify a suitable period of reduced motion in block 222, for example by using any of the techniques described above Accelerometer output 220 is also fed to motion classification block 214 for use in determining a reference orientation of portable device 100 as described above when periods of reduced motion exist Based on the comparison of the estimated orientations using a plurality of sensitivity candidates and the reference orientation, calibration module 224 may determine a calibrated sensitivity value.

In the described embodiments, a chip is defined to include at least one substrate typically formed from a semiconductor material A single chip may be formed from multiple substrates, where the substrates are mechanically bonded to preserve the functionality A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover Integrated Circuit (IC) substrate may refer to a silicon substrate with electrical circuits, typically CMOS circuits In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a motion tracking module also referred to as Motion Processing Unit (MPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated Some embodiments include accelerometer, gyroscope, and magnetometer, which each provide a measurement along three axes that are orthogonal to each other. Such a device is often referred to as a 9-axis device Other embodiments may not include all the sensors or may provide measurements along one or more axes. The sensors may be formed on a first substrate. Other embodiments may include solid-state sensors or any other type of sensors The electronic circuits in the MPU receive measurement outputs from the one or more sensors. In some embodiments, the electronic circuits process the sensor data The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification In the described embodiments, raw data refers to measurement outputs from the sensors which are not yet processed Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a MPU may include processors, memory, control logic and sensors among structures.

Although the present invention has been described in accordance with the embodiments shown, one of ordinary skill in the art will readily recognize that there could be variations to the embodiments and those variations would be within the spit it and scope of the present invention. Accordingly, many modifications may be made by one of ordinary skill in the art without departing from the spirit and scope of the present invention.

What is claimed is:

1. A method for calibrating gyroscope sensitivity for a portable device, comprising:
   obtaining motion data from at least a gyroscope and at least one other motion sensor;
   detecting a motion pattern in the motion data comprising at least a first period of reduced motion and at least a second period of increased motion;
   determining a reference orientation for the portable device during the first period using at least one motion sensor other than the gyroscope;
   obtaining gyroscope data for the portable device during the second period;
   determining a plurality of alternative estimated orientations for a same instant for the portable device by applying a plurality of candidate gyroscope sensitivity values to the gyroscope data over a complete length of the second period; and
   determining a difference between the reference orientation and the plurality of alternative estimated orientations; and
   deriving a calibrated gyroscope sensitivity value non-iteratively using a predefined relationship in which gyroscope sensitivity is dependent on a minimum difference between the reference orientation and alternative estimated orientations.

2. The method of claim 1, further comprising an additional reference orientation during a third period.

3. The method of claim 1, wherein the at least one other motion sensor comprises an accelerometer.

4. The method of claim 1, further comprising applying the calibrated sensitivity value to subsequent gyroscope data.

5. The method of claim 1, wherein the first period is detected by comparing the obtained accelerometer data to gravity.

6. The method of claim 1, wherein the reference orientation determined during the first period of reduced motion that is detected by comparing a norm of the gyroscope data to a threshold.

7. The method of claim 1, wherein the detection of the second period comprises detection of a predefined motion pattern.

8. The method of claim 7, wherein the predefined motion pattern includes at least a period of increased motion occurring primarily along a single axis.

9. The method of claim 1, wherein determining the alternative estimated orientations and the reference orientation and the estimated orientations automatically occurs when the first period and the second period occur.

10. The method of claim 1, wherein the first period and the second period are contiguous.

11. The method of claim 1, wherein the first period and the second period are not contiguous.

12. The method of claim 11, wherein the first period and the second period occur within a threshold period.

13. The method of claim 1, wherein the reference orientation is two dimensional.

14. The method of claim 1, wherein the at least one other motion sensor comprises a magnetometer data and wherein the reference orientation is three dimensional.

15. The method of claim 1, further comprising representing the reference orientation and the alternative estimated orientations as quaternions, wherein determining the difference between the reference orientation and the estimated orientations comprises calculating the dot product of the reference orientation and each of the alternative estimated orientations.

16. The method of claim 15, further comprising fitting the calculated dot products to the predefined function and the calibrated sensitivity value corresponds to a maximum value of the predefined function.

17. The method of claim 16, wherein the plurality of candidate sensitivity values is a minimal number of candidate sensitivity values.

18. The method of claim 1, wherein determining the difference between the reference orientation and the alternative estimated orientations comprises calculating an error with respect to each estimated orientation and wherein the calibrated sensitivity value is selected from the candidate sensitivity values representing a minimized error.

19. The method of claim 18, further comprising:
determining refined candidate sensitivity values from the calibrated sensitivity value;
determining refined estimated orientations for the portable device from the gyroscope data using the refined candidate sensitivity values; and
comparing the reference orientation with the refined estimated orientations to derive a refined calibrated sensitivity value.

20. The method of claim 1, further comprising initiating calibration based at least in part on an operating state of the portable device.

21. A portable device comprising:
a gyroscope for providing gyroscope data;
at least one other motion sensor; and
a calibration module for gyroscope sensitivity, wherein the calibration module is configured to:
detect a motion pattern in the motion data comprising at least a first period of reduced motion and at least a second period of increased motion;
determine a reference orientation for the portable device during the first period using data obtained from the at least one other motion sensor;
concurrently determine a plurality of alternative estimated orientations for a same instant for the portable device by applying a plurality of candidate gyroscope sensitivity values to gyroscope data over a complete length of the second period;
determine a difference between the reference orientation and the plurality of alternative estimated orientations; and
derive a calibrated sensitivity value non-iteratively using a predefined relationship in which gyroscope sensitivity is dependent on a minimum difference between the reference orientation and alternative estimated orientations.

22. The portable device of claim 21, wherein the at least one other motion sensor comprises an accelerometer for providing accelerometer data, wherein the calibration module determines the reference orientation for the portable device using accelerometer data.

* * * * *